Nov. 20, 1956 D. W. SIMPSON ET AL 2,771,193

ION EXCLUSION

Filed Oct. 19, 1953 8 Sheets-Sheet 1

INVENTORS.
Donald W. Simpson
BY William C. Bauman.

Griswold & Burdick
ATTORNEYS

INVENTORS.
Donald W. Simpson
William C. Bauman
BY
Griswold & Burdick
ATTORNEYS

Nov. 20, 1956 D. W. SIMPSON ET AL 2,771,193

ION EXCLUSION

Filed Oct. 19, 1953 8 Sheets-Sheet 3

INVENTORS.
Donald W. Simpson
William C. Bauman
BY

Griswold & Burdick
ATTORNEYS

Nov. 20, 1956 D. W. SIMPSON ET AL 2,771,193

ION EXCLUSION

Filed Oct. 19, 1953 8 Sheets-Sheet 4

INVENTORS.
Donald W. Simpson
William C. Bauman.
BY
Griswold & Burdick
ATTORNEYS

INVENTORS.
Donald W. Simpson
William C. Bauman
BY
Griswold & Burdick
ATTORNEYS

INVENTORS.
Donald W. Simpson
BY William C. Bauman

Griswold & Burdick
ATTORNEYS

Nov. 20, 1956 D. W. SIMPSON ET AL 2,771,193

ION EXCLUSION

Filed Oct. 19, 1953 8 Sheets-Sheet 7

INVENTORS.
Donald W. Simpson
William C. Bauman
BY
Griswold & Burdick
ATTORNEYS

Nov. 20, 1956 D. W. SIMPSON ET AL 2,771,193

ION EXCLUSION

Filed Oct. 19, 1953 8 Sheets-Sheet 8

INVENTORS.
Donald W. Simpson
BY William C. Bauman

Griswold & Burdick
ATTORNEYS

United States Patent Office 2,771,193

Patented Nov. 20, 1956

2,771,193

ION EXCLUSION

Donald W. Simpson, Auburn, and William C. Bauman, Midland, Mich., assignors to The Dow Chemical Company, Midland, Mich., a corporation of Delaware Application October 19, 1953, Serial No. 386,782

16 Claims. (Cl. 210—42.5)

Figure 1:
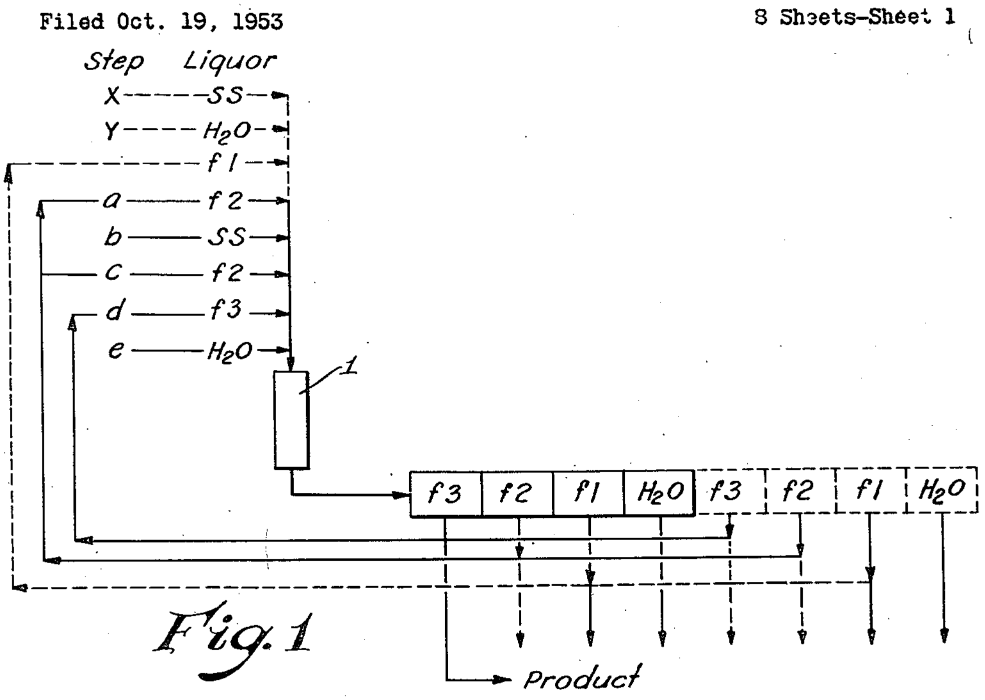

This invention concerns an improved ion exclusion process for the treatment of a solution containing a highly ionized solute and a less extensively ionized, or non-ionized, solute to separate the solutes from one another. It pertains especially to improvements over a process (now known as an "ion exclusion" process) for separating such solutes disclosed in a copending application of W. C. Bauman, Serial No. 266,027, filed January 11, 1952, issued July 20, 1954, as Patent No. 2,684,331, and assigned to the owner of this application, whereby the less ionized solute may be recovered in a higher peak concentration in the effluent liquor than when operating in accordance with the method of said patent under otherwise similar conditions.

The process of the above-mentioned Bauman Patent 2,684,331 is different from, and almost opposite in principle to, a conventional ion exchange process. It does not require occurrence of an ion exchange reaction, but apparently involves exclusion by the ion exchange resin of the highly ionized solute in the solution treated therewith. It is advantageous in that the procedure and equipment involved are simple and a chemical treatment of the ion exchange resin, e. g. to regenerate the same, is not required. However, the concentration of each solute in the effluent fraction containing the same is usually much lower than in the starting solution fed to the process. Such extensive dilution of the solutes during separation of the same is often disadvantageous.

It is an object of this invention to provide an improved method for separating solutes, having different degrees of ionization, which permits recovery of one or both of the solutes, especially the less ionized solute, in a concentration higher than is obtained with a similar starting solution by the method described above. Other objects will be evident from the following description of the invention.

The present method is a modification of that described above and employs the same kinds of starting materials. For purpose of clarity in describing the invention, the aqueous solution of the solutes to be separated, i. e. the solution which is fed to the process, will hereinafter be referred to as the "starting solution" and a highly ionized solute, having an ionization constant at least as great as $5 \times 10^{-2}$, and a less extensively ionized solute, having an ionization constant not exceeding $2 \times 10^{-1}$ and not more than 70 percent as great as that of the highly ionized solute present in the solution will be referred to as solutes "A" and "B," respectively.

In practice of the present method, the starting solution, comprising both of the solutes A and B, may advantageously be fed to the ion exchange resin bed in amount such that there are obtained, upon then passing water through the bed, the three aforementioned successive fractions of effluent liquor, i. e. (1) a fraction comprising solute A in a form substantially free of B, (2) an intervening mixed fraction comprising solutes A and B, and (3) a fraction comprising solute B in a form substantially free of solute A. Each such fraction is collected in portions as it flows from the bed. When operating in this manner, it has been found that a loss of the less ionized of the solutes, i. e. solute B, can be avoided and the aforestated advantages of the invention be obtained by carrying out the following cycle of successive operations:

(*x*) Feed the starting solution to the ion exchange resin bed in amount sufficient to cause formation of an effluent liquor comprising all three of the aforementioned fractions upon subsequent passage of water through the bed.

(*y*) Pass water through the bed and collect said fractions of effluent liquor, or at least the fractions (2) and (3).

(*a*) Feed to the bed a portion of the effluent liquor fraction (2) obtained in the preceding operation, which fraction contains both of the solutes A and B.

(*b*) Feed a portion of the starting solution to the resin bed.

(*c*) Feed further successive portions, and preferably the remainder, of effluent liquor fraction (2) to the bed.

(*d*) Feed at least a portion of the effluent liquor fraction (3), from a preceding operation, to the bed, which fraction is that containing the less extensively ionized solute B in a form substantially free of the highly ionized solute A.

(*e*) Pass water through the bed and collect the aforementioned fractions (2) and (3) of the effluent liquor or, if desired, all of the fractions (1), (2) and (3).

The effluent liquor fraction (3) obtained in step (*e*) is usually of larger volume and contains a higher peak concentration of the less ionized solute B than does the corresponding fraction (3) obtained in step (*y*). In other words, the intervening steps (*a*), (*b*), (*c*) and (*d*), especially steps (*a*), (*c*), and (*d*) cause an increase in the volume and the peak concentration of the resulting effluent liquor fraction (3) over that obtained by steps (*x*) and (*y*). The peak, i. e. maximum, concentration of solute B in the fraction (3), obtained in step (*e*), is usually higher than the concentration of solute B in the starting solution. The reason why solute B usually becomes more concentrated while being separated by the combination of steps (*a*)–(*e*) is not known with certainty.

In the above outline of steps which may be carried out for practice of the invention, steps (*x*) and (*y*) amount to practice of the method of the aforementioned Bauman Patent 2,684,331, and are merely for purpose of providing the effluent liquor fractions (2) and (3) which are employed as feed materials in steps (*a*), (*c*) and (*d*) of the process. Once the process is under way, steps (*x*) and (*y*) need not be repeated, i. e. thereafter each cycle of operations involved in the process may consist essentially of the above-mentioned successive steps (*a*), (*b*), (*c*), (*d*) and (*e*), the fractions (2) and (3) for use as feed materials in steps (*a*), (*c*) and (*d*) then being obtained in step (*e*) of a preceding cycle of the process. Also, instead of carrying out steps (*x*) and (*y*) to supply the liquor fractions (2) and (3) for use in steps (*a*), (*c*) and (*d*), either or both of said liquor fractions (2) and (3), comprising solutes A+B and solute B, respectively, may be obtained from other sources, e. g. by mixing the individual ingredients thereof.

It has also been found that step (*a*) (of feeding liquor fraction (2) containing both of the solutes A and B to the resin bed) may advantageously be discontinued at about the point at which the concentration of solute A in the liquor being fed to the bed is starting to decrease from a peak concentration, and step (*b*) (i. e. feed of starting solution to the bed) be started at this point. Step (*a*) can be discontinued short of the point just mentioned, but this results in an increase in the volume of effluent liquor fraction (2) to be recycled. If feed of fraction (2) is continued to any great extent beyond the point just recommended, the concentration of solute B in successive portions of the effluent liquor collected in step (*e*) usually rises to a maximum value, then decreases somewhat, again rises, usually to a different maximum value, and decreases. This amounts, in effect, to a scattering of solute B in the effluent liquor. It renders the process more difficult to carry out and reduces the efficiency of the process in separating the solutes A and B.

In the early stages of the process, the maximum concentration of the less ionized solute B in the effluent liquor obtained in step (*e*) increases from one cycle of the process to the next and the volume of effluent liquor containing solute B also increases. However, after several cycles of operation, the maximum concentration of solute B in the effluent liquor reaches a condition of balance and thereafter remains substantially constant from one cycle of the process to the next.

It has been found that the maximum concentration of the less ionized solute B in the effluent liquor is dependent in part on the concentration of solute B in the starting solution and in part on the concentration of the highly ionized solute A in the starting solution, or in the effluent liquor fraction (2) which is recycled. For a given concentration of solute A in the starting solution an increase in the concentration of solute B therein results in an increase in the maximum concentration of solute B in the effluent liquor from the process. For a given concentration of solute B in the starting solution an increase in the concentration of solute A in the starting solution results in an increase in the maximum concentration of solute B in the effluent liquor. By employing a starting solution containing the solute A in 1-normal concentration or higher, an effluent liquor can be produced which contains the solute B in a concentration higher than in the starting solution. Although the invention is effective for the treatment of any aqueous solution of such solutes A and B, the starting solutions which are usually employed contain the highly ionized solute A in a concentration at least as great as 1-normal and preferably in 2-normal concentration or higher. In instances in which a starting solution of such solutes A and B contains the highly ionized solute in a concentration lower than just stated, it may be enriched by adding a highly ionized solute such as sodium chloride, ammonium chloride, or sodium sulfate, etc., prior to being employed in the process.

After several cycles of operation in accordance with the method just described, the effluent liquor comprises a substantial amount of fraction (3) containing the less ionized solute B in a form free, or nearly free, of solute A, and may comprise substantial amounts of all of the aforementioned fractions (1)–(3). Thereafter, a portion of the effluent liquor fraction (3), preferably a portion containing solute B at, or near its maximum concentration, is withdrawn as product in some, or all, cycles of the process. A portion or all of fraction (1) may also be withdrawn in such cycle. Fraction (2), or a portion thereof, and one or more portions of fraction (3) continue to be recycled.

In each cycle of the process, the amount of starting solution fed to the bed of ion exchange resin is preferably such as to cause formation of an intermediate effluent liquor fraction (2) containing each of the solutes A and B in a maximum weight percent concentration (in the richest portion of said fraction) corresponding closely to, e. g. from 0.8 to 1.2 times, the concentration of the same solute in the starting solution. In general, the maximum concentration of the less ionized solute B in effluent liquor fraction (2) decreases with decrease in the amount of starting solution employed in a cycle of the process and increases with increase in the amount of starting solution used. The starting solution can be fed in an amount larger, or somewhat smaller, than the preferred amount just stated. Use of a smaller amount of the starting solution causes a corresponding decrease in the maximum concentration of the less ionized solute B in the resulting effluent liquor and this effect becomes more pronounced as the amount of starting solution fed to the system is decreased. Use of more than the above stated preferred amount of starting solution merely increases the volume of the portion of resulting effluent liquor, especially the volume of fraction (2) which should be recycled, but otherwise is not detrimental.

The process is usually carried out at room temperature or thereabout, but any, or all, of the operations involved in the process can be accomplished at lower or higher temperatures, e. g. at temperatures between the freezing or congealing point and the boiling point of the liquor under treatment. Since an object of the process is to separate from a starting solution comprising both of the aforementioned solutes A and B, a liquor fraction containing one of the solutes, preferably B, in a form substantially free of the other, it is important that intermixing of the effluent liquor fractions formed in the process be avoided as nearly as possible. This may be accomplished by employing low rates of feed of liquids to a bed of ion exchange resin so as to avoid, or limit, occurrence of eddy currents in the bed and by collecting the effluent liquor fractions comprising either or both of the solutes A and B in small successive portions. In general, it becomes more difficult to avoid, or curtail, intermixing of the liquor fractions as the temperature of the liquor is raised. However, by careful operation, the process can be carried out successfully at temperatures closely approaching the boiling point of the liquor being handled.

Instead of operating in an intermittent or batchwise manner, as just described, the process can be carried out in continuous manner. This may be accomplished by simultaneously employing two or more beds of ion exchange material in the process, with parallel feed of liquor to the individual beds, the starting solution being fed to one bed while passing water into another bed, previously treated with the starting solution, to obtain effluent liquor fractions comprising the respective solutes A and B, each in a form substantially free of the other. By such simultaneous use of different ion exchange resin beds to carry out different operations involved in the process, and periodically changing the kind of feed to each bed so that it is used in all of the aforementioned successive steps of the process, while withdrawing as product a portion of the effluent liquor fraction (containing one of the solutes, e. g. solute B, in a form substantially free of the other) obtained alternately from the respective beds, a continuous stream of the product may be obtained from the treating system as a whole. Instead of employing one or more fixed beds of ion exchange resin in practice of the invention, the process can be carried out in continuous manner by recycling the ion exchange resin through a treating zone, e. g. a vertical column, while feeding water and the starting solution comprising both of the solutes A and B to the treating zone at suitable points along the path of travel of the resin and withdrawing the aforementioned individual effluent liquor fractions (1) and (3) at suitable points along said path. In this mode of operation, the aforementioned essential combination of steps (*a*)–(*e*) is inherently carried out, even though certain of the liquor recycling operations appear to be omitted. A liquor fraction (2) comprising both solutes in proportions or concentrations varying from those of the solutes in the starting solution is formed within the column near and usually slightly above, the point of feed of the starting solution. It tends to be consumed as it is formed and need not be withdrawn from the column. Similarly, portions of fraction (3), other than that withdrawn as product, are present and are consumed within the column, i. e. by the action of the ion exchange resin in absorbing the solute B therefrom. Accordingly, during its travel through the treating zone, the resin is employed in each of the aforementioned successive steps of the process for separation of the solutes A and B. When the resin leaves the treating zone it is in condition for reemployment in, and recycling to, the zone.

Various features of the process are illustrated in the accompanying drawing.

Fig. 1 of the drawing is a schematic flow sheet indicating the successive steps *x*, *y*, *a*, *b*, *c*, *d*, and *e*, of feeding various liquors to a treating column 1, containing an ion exchange resin which initially is immersed in water and also indicating the fractions into which liquid, flowing from the column during the successive feeding steps, may be cut. The flow sheet also indicates which fractions are partially or wholly recycled and which are withdrawn from the system. The initial steps *x* and *y* are indicated by broken lines, since they are usually employed only in starting the process and are merely for purpose of forming effluent liquor fractions suitable for recycling in the process. After the process has been started, the essential feeding steps in each cycle of operations are those indicated as *a*, *b*, *c*, *d* and *e*. The portions of effluent liquor resulting from the starting steps *x* and *y* are also indicated by broken lines, since steps *x* and *y* usually are not repeated.

In the drawing, the starting solution containing solutes A and B is abbreviated as "SS," the effluent liquor fraction (1) containing the highly ionized solute A in a form substantially free of the less ionized solute B is abbreviated as "*f*–1," the intermediate effluent liquor fraction (2) containing both of the solutes A and B is abbreviated as "*f*–2," and the effluent liquor fraction (3) containing solute B in a form substantially free of solute A is abbreviated as "*f*-3." Steps which are optional and need not be employed are indicated by broken lines. The effluent liquor is shown as a band which is divided into segments labeled to indicate the fractions which they represent. The effluent liquor fractions, or the portions thereof, which are to be recycled should be returned to column 1 in the same order, relative to one another, that they flowed from the column, e. g. fraction (2) should be returned prior to fraction (3).

In practice of the process, fraction (1) containing the highly ionized solute A and very little, if any, of solute B may be recycled to column 1, or be withdrawn from the system, or part of it may be recycled and part be withdrawn. It often is advantageous to return fraction (1) in each of the first several cycles of operation to build up its volume and thereafter to withdraw it from the system in each of the subsequent cycles of operation. Such practice facilitates separation of the fractions (1) and (2). Part, or all, of fraction (2) is recycled to column 1. A further portion of the starting solution, comprising solutes A and B, is fed to the column, preferably at about the stage at which the concentration of solute A in recycle liquid, i. e. in early portions of fraction (2), being fed to the column, starts to decrease. Interruption of the introduction of fraction (2) and commencing feed of the starting solution prior to reaching this stage causes an increase in the amount of effluent liquor to be recycled, but does not otherwise interfere with the operability of the process. A slight overshooting of the above stage can be tolerated, e. g. the introduction of fraction (2) may be terminated, and feed of the starting solution be commenced when the concentration of solute A in the portion of liquor fraction (2) being fed has decreased to as little as half of its maximum value. However, this causes operating difficulties and a decrease in efficiency of the process as a whole which become more serious with increase in the extent to which said stage is overshot. After terminating feed of the starting solution, part, or all, of the effluent liquor fraction (3) is returned to column 1. The operations just described result in displacement of water from the column. Water is then fed to the column. The effluent liquor thus displaced from the column is collected as the successive fractions (1), (2) and (3). A portion of fraction (3), preferably that richest in solute B, may be withdrawn as product and the remainder be recycled in the subsequent cycles of operation.

Figure 2:
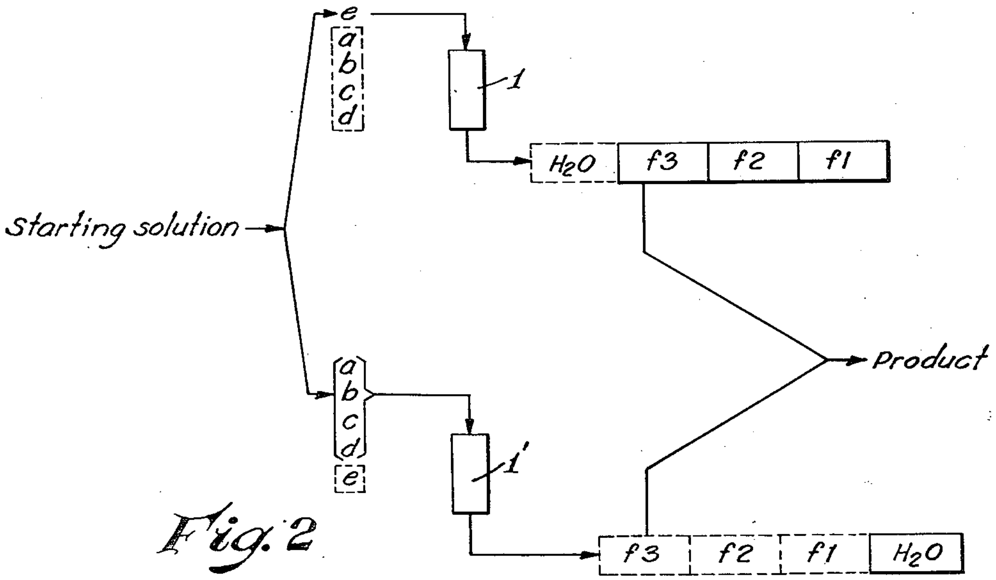

Fig. 2 of the drawing is a flow sheet indicating steps and an arrangement of apparatus for practicing the invention in continuous manner by simultaneous use of two beds of ion exchange resin situated in the columns, 1 and 1'. The symbols and abbreviations in Fig. 2 are similar to those employed in Fig. 1. With respect to each column of ion exchange resin, the successive steps, *a–e*, of feeding different liquids thereto are indicated one above the other. Steps and effluent liquor fractions which are to be employed or produced, but not in the period of operation indicated, are enclosed by broken lines. The continuous process illustrated by Fig. 2 includes recycling steps, not shown, which are similar to those indicated in Fig. 1. Fig. 2 shows a parallel arrangement of only two beds of ion exchange resin, but in practice it is advantageous to use a similar arrangement of three or more beds so as to facilitate obtainance of a steady stream of the product which is separated by the process.

Figure 3:
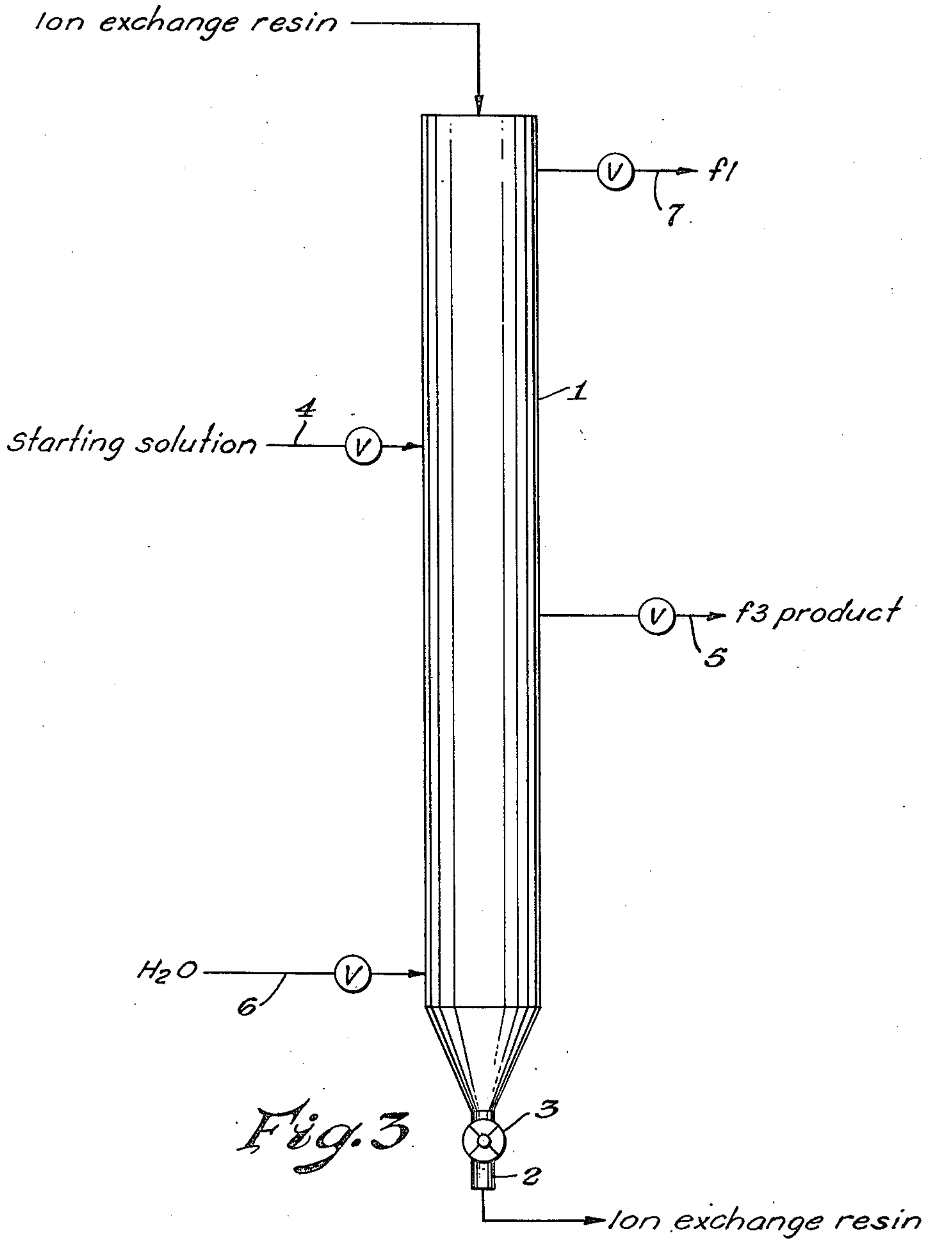

Fig. 3 shows, in schematic manner, another arrangement of apparatus for practice of the invention in continuous manner and indicates the flow of materials therethrough. In Fig. 3, the numeral 1 designates a column which is filled with liquid and ion exchange resin. At the bottom of the column is an outlet line 2, which is provided with a star valve 3, that may be operated to discharge pockets of ion exchange resin and liquid from the column while preventing free flow of liquid through the outlet. Column 1 is provided, at the midsection thereof, with a valved inlet 4 for the starting solution comprising a highly ionized solute and a less ionized solute which are to be separated. Also, in a midsection of column 1, but below inlet 4, is a valved outlet line 5 for the liquor fraction (3), containing the less ionized solute B, in a form substantially free of the highly ionized solute A, which is usually desired as product. Column 1 is provided, near the bottom, with a valved water inlet 6 and near the top with a valved liquor outlet 7. The openings from column 1 to inlet lines 4 and 6 and to outlet lines 5 and 7 are preferably covered with screens, not shown, to prevent flow of ion exchange material into the lines. Conventional means, not shown, are provided for the return of ion exchange resin, discharged through outlet 2, to the upper section of column 1.

Materials employed in practice of the invention may move lengthwise in either direction through the treating zone. When using a fixed bed of ion exchange resin in a column, it is most convenient to pass liquids downward through the bed, but the liquor flow may be upward, if desired.

Figs 4–18 of the drawing are graphs showing the composition of successive portions of the effluent liquors obtained in a number of tests of the invention. In each graph, the milliliters of effluent liquor collected in a single cycle of operations of the process is indicated on the horizontal axis and the concentration of each solute in successive portions of the effluent liquor is indicated on the vertical axis. Each such concentration is expressed as the ratio $Ce/Cf$, of the weight percent concentration of a solute in the effluent liquor to the concentration of the same solute in the starting solution. Thus, concentration values greater than 1 indicate that a solute is more concentrated in a portion of the effluent liquor than in the starting solution. The curve in each graph for the concentrations of the highly ionized solute is shown as a broken line and the curve for concentrations of the less ionized solute is shown as a solid line.

In the graphs of Figs. 4–18, an arrow marked "SS" indicates the point at which recycling of the effluent liquor (as part of the feed material in the next cycle of the process) was interrupted and a further amount of starting solution was fed to the bed of ion exchange resin, i. e. portions of the effluent liquor to the left of said arrow on each graph were fed to the bed, then starting solution was fed, then portions of the effluent liquor to the right of the arrow were fed to the bed. In instances in which portions of the effluent liquor were discarded or withdrawn as product, rather than being returned as part of the feed material to the bed of ion exchange resin, the graphs are marked to indicate this fact.

Due to the fact that the column of ion exchange resin contains a considerable amount of liquor, the liquor feeding steps of the second operating cycle, i. e. the steps of recycling early effluent liquor fractions from the first operating cycle and of then feeding additional starting solution to the column, are usually carried out while final portions of the effluent liquor from the first operating cycle are being withdrawn from the column.

Figs. 4–12 are graphs showing the concentrations of sodium chloride and ethylene glycol in various portions of liquor that flowed from an ion exchange resin bed in early successive cycles of three tests of the invention as applied, respectively, to the treatment of three aqueous starting solutions of sodium chloride and ethylene glycol. Each of the starting solutions contained 10 percent by weight of ethylene glycol. They contained 5, 10 and 20 percent, respectively, of sodium chloride.

Figure 4:
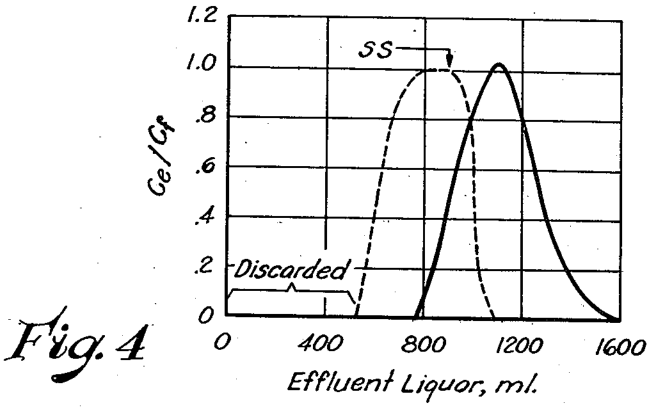
Figure 5:
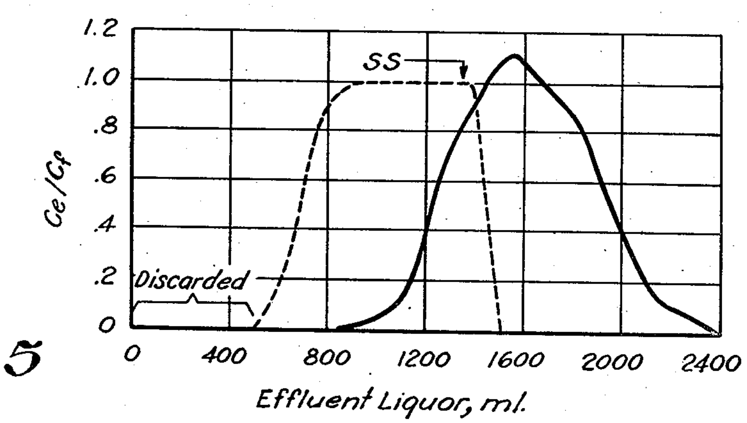
Figure 6:
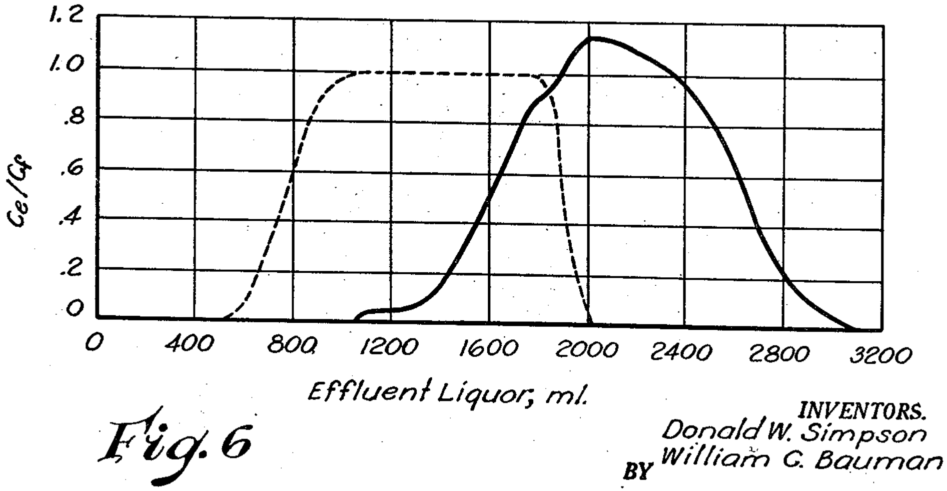
Figure 7:
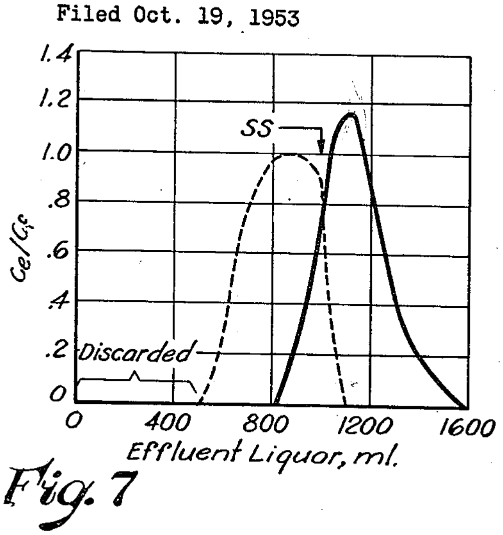
Figure 10:
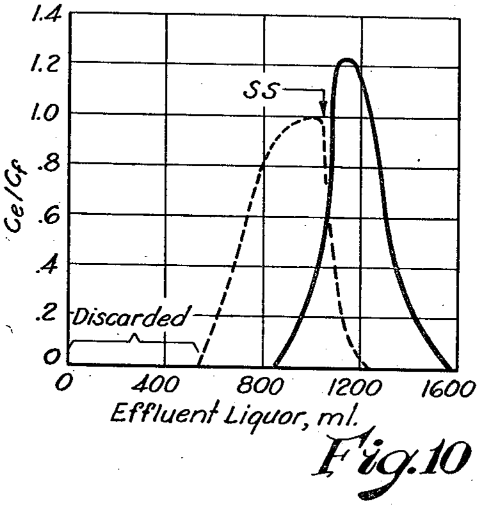
Figure 8:
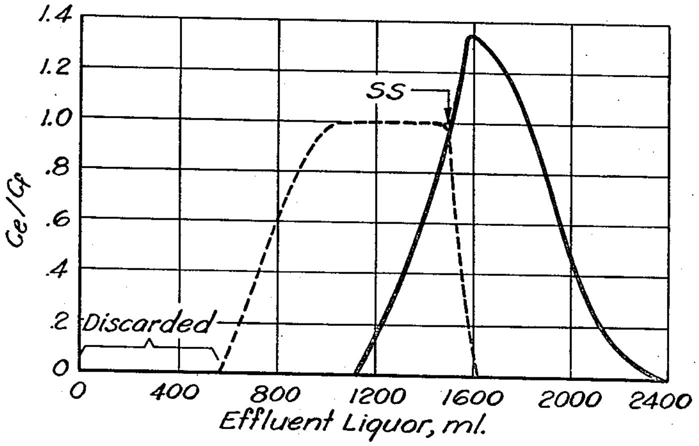
Figure 9:
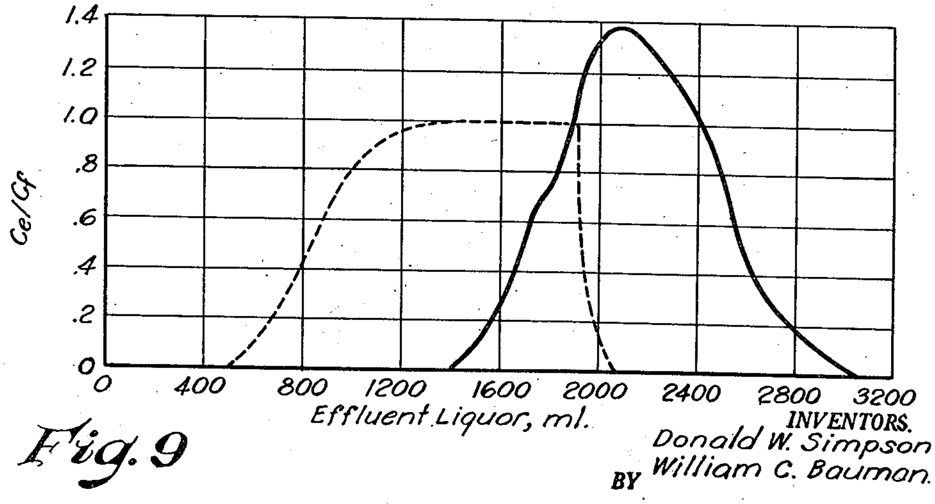
Figure 11:
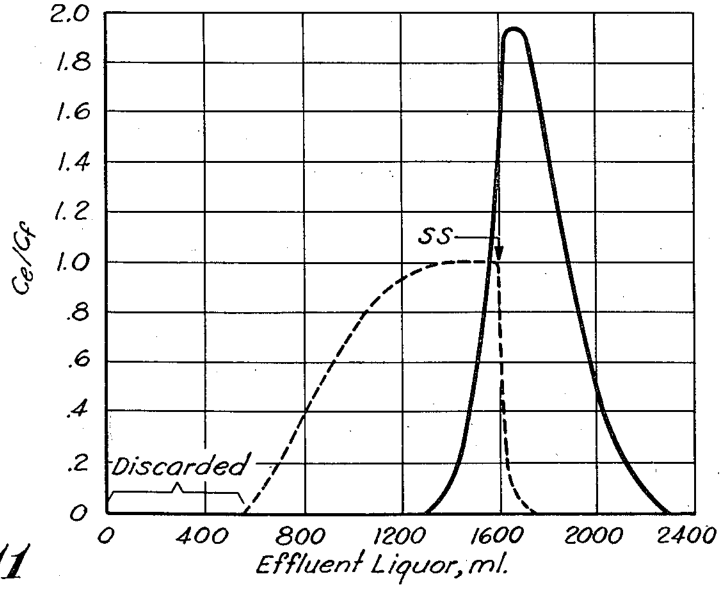
Figure 12:
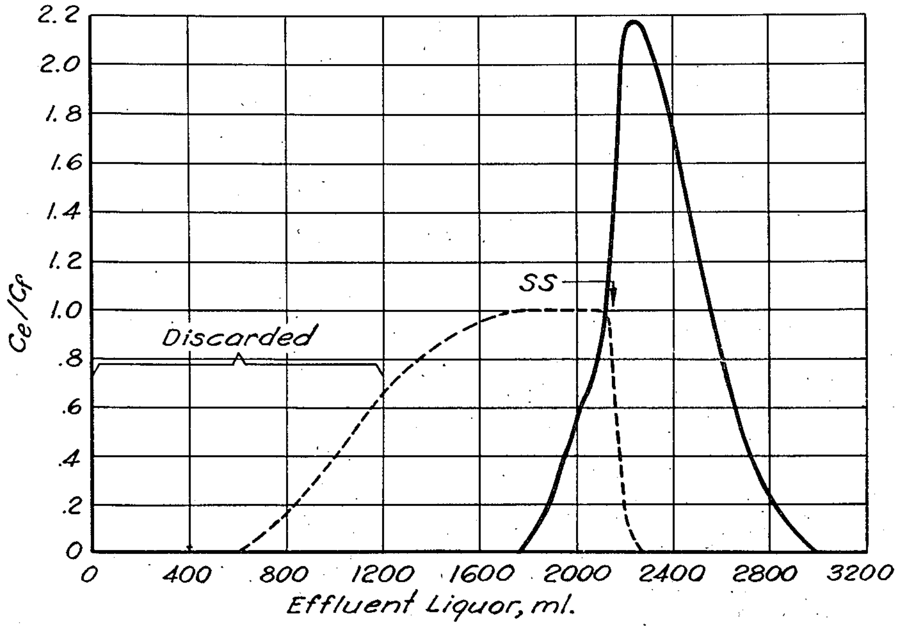
Figure 13:
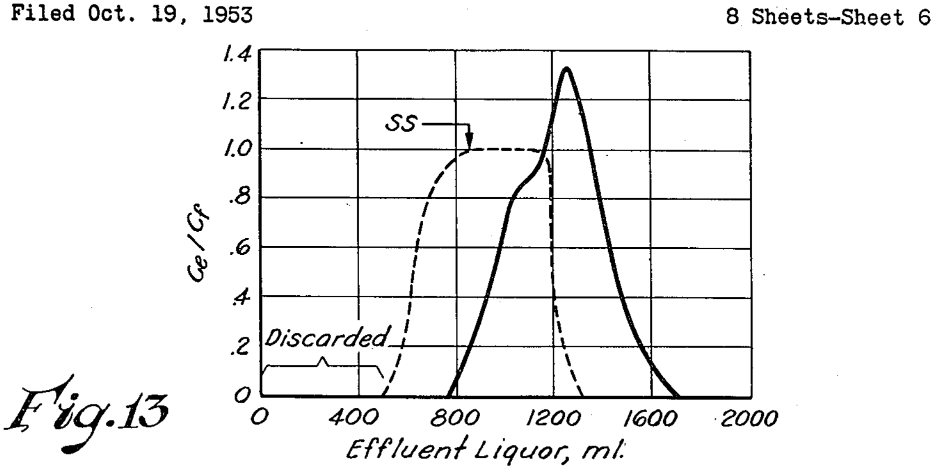
Figure 14:
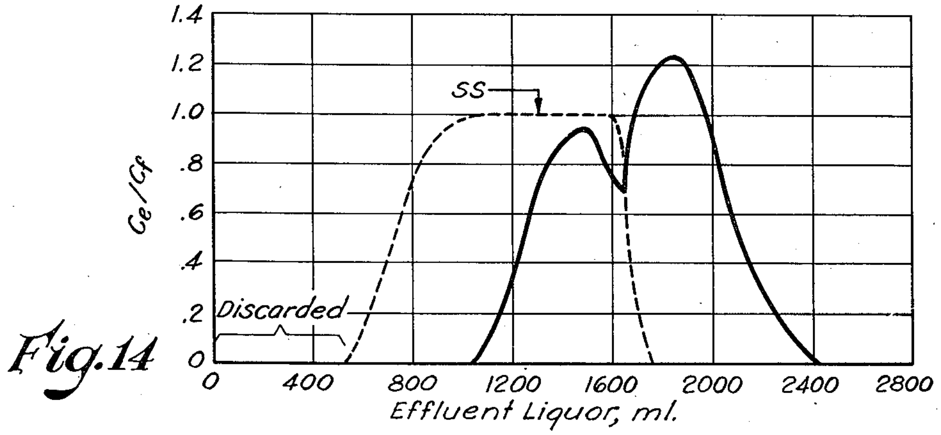
Figure 15:
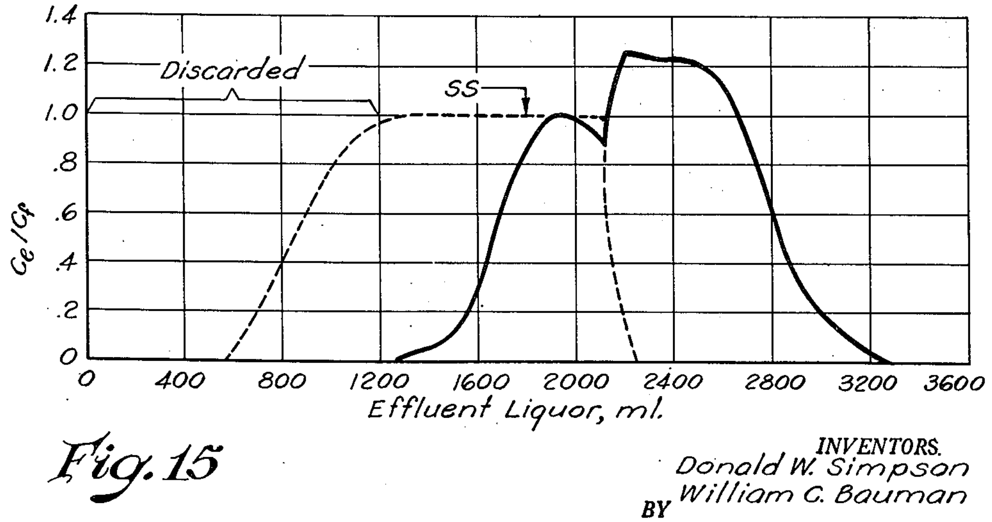

Figs. 4–6 give values obtained in the first, second and third cycles, respectively, of the hereinbefore described process as applied using an aqueous starting solution containing 5 weight percent of sodium chloride and 10 percent of ethylene glycol and employing, as part of the feed material in each of the second and third cycles, all of the successive portions of effluent liquor containing one or both of the solutes (i. e. not the effluent liquor fraction consisting of water alone) which were obtained in the preceding cycle. Figs. 7–9 give data obtained in similar operations using a starting solution containing 10 weight percent of sodium chloride and 10 percent of ethylene glycol. Figs. 10–12 give data obtained in similar operations using a starting solution containing 20 percent of sodium chloride and 10 percent of ethylene glycol.

It will be evident from Figs. 4–6, also from Figs. 7–9, and also from Figs. 10–12 that the effluent liquor recycling operations of the invention have an effect of increasing, from one operating cycle to the next, the volumes of the effluent liquor fractions containing the respective solutes and also of increasing the maximum concentration of the less ionized solute, e. g. ethylene glycol, in the effluent liquor fractions containing the same. It will also be evident, from a comparison of Figs. 4–6 with Figs. 7–9 and Figs. 10–12, that an increase in concentration of the more highly ionized solute (NaCl) in the starting solution results in an increase in the maximum concentration of the less ionized solute (ethylene glycol) in the effluent liquor.

Figs. 13–18 of the drawing are graphs showing the effect of feeding starting solution at a stage, in each operating cycle of the process, earlier or later than that hereinbefore indicated to be preferable. Said graphs are based on data obtained in six successive operating cycles of the process using an aqueous solution of 10 weight percent sodium chloride and 10 percent ethylene glycol as the starting solution and with return of at least a portion of the successive fractions of effluent liquor obtained in each of the operating cycles to the column of ion exchange resin in the next such cycle. A portion of the starting solution was also fed to the column in each operating cycle. The steps of feeding liquor to the column in a given, e. g. the second, operating cycle are usually under way while final portions of the effluent liquor from the preceding cycle are being withdrawn from the column.

Figs. 13–17 show the results of feeding starting solution to the column at a stage earlier in an operating cycle than the preferred stage just mentioned. Such premature feed of the starting solution causes an abnormal increase in the volume of the resulting effluent liquor fraction (2), and thus necessitates recycle of an increased volume of said fraction (2) in order to avoid loss, but does not otherwise interfere seriously with the operability of the process. Such premature feed of the starting solution in an operating cycle of the process is somewhat disadvantageous, but can be tolerated, especially if half or more of the effluent liquor fraction (2), containing both solutes, from the preceding cycle has been fed to the column when feed of the starting solution is commenced.

Figure 18:
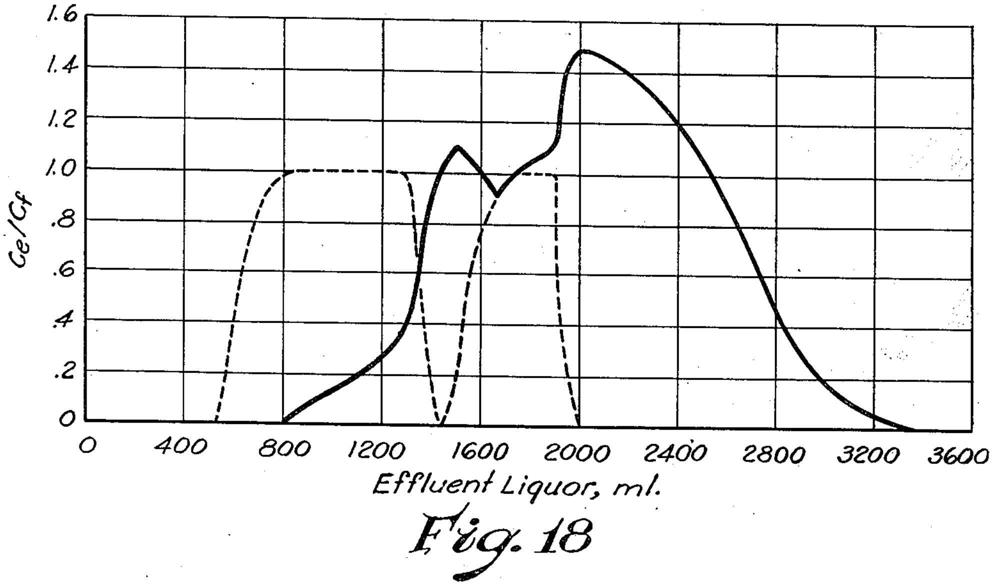

Fig. 18 shows the results of feeding starting solution to the column of ion exchange resin at a stage later in an operating cycle than the preferred stage mentioned above. Such unduly late feed of the starting solution causes formation of two distinct effluent liquor fractions comprising the highly ionized solute A and thereby complicates the steps of returning suitable portions of the effluent liquor to the column in the next operating cycle. In an operating cycle of the process, the starting solution may be introduced to the column somewhat later than at the preferred stage hereinbefore mentioned, e. g. when the concentration (expressed as percent by weight) of the highly ionized solute A in liquor being fed to the column has decreased to as little as half the concentration of solute A in the starting solution, but feed of the starting solution at a stage later than just stated should be avoided.

The following examples are illustrative of the invention and are not to be construed as limiting its scope.

EXAMPLE 1

A cylindrical column of 2.75 inches internal diameter was filled to a depth of 15 inches with a bed of the ion exchange resin, Dowex 50 (a sulfonated copolymer of styrene, ar-ethylvinylbenzene and divinylbenzene), in its sodium form. The ion exchange resin was in the form of beads of from 50 to 100 Tyler screen mesh size. The column, containing the ion exchange resin, was filled with water. Into the top of the column, 500 ml. of an aqueous solution of sodium chloride in 5 weight percent concentration and ethylene glycol in 10 percent concentration was fed at a rate of from 35 to 40 ml. per minute. This liquor feed rate was used in all steps of the process. During feed of the aqueous sodium chloride and ethylene glycol starting solution an equal volume of displaced liquid flowed from the column through a bottom outlet. Feed of the starting solution was followed by feed of water to the column. The amount of water used in this step of each cycle of the operations involved in the process was not measured, but is estimated as about 900 ml. The step of feeding water to the column was regarded as the final feeding step in the first cycle of operations involved in the process. The displaced liquid flowing from the bottom of the column during the above liquor feeding steps was collected in successive 50 ml. portions which were tested to determine the concentrations of sodium chloride and ethylene glycol therein. The first 550 ml. of the effluent liquor consisted substantially of water. It was discarded, although it could have been recycled and used as the feed water for completion of the liquor feeding steps of the first operating cycle. Subsequent portions of the effluent liquor from the first operating cycle contained one or both of the above mentioned solutes. They were returned into the top of the column in the order, relative to one another, in which they were collected. The return to the column of effluent liquor collected in the first cycle was interrupted when the concentration of sodium chloride in the liquid being fed to the column had been at a maximum value and had just started to decrease. Another 500 ml. portion of the starting solution was then fed to the column, after which the remaining portions of the effluent liquor collected in the first cycle were fed to the column. About 900 ml. of water was next fed to the column. This completed the liquor feeding steps of the second cycle of the process. During all of the feeding steps, liquor displaced from the column through the bottom outlet was collected in successive portions and tested as in the first cycle of the process. Again, the first 550 ml. of the effluent liquid was water and was discarded. A third operating cycle was carried out by repeating the procedure of the second cycle. The concentration of the respective solutes, sodium chloride and ethylene glycol, found in successive portions of the effluent liquor obtained in each of the three operating cycles just described were plotted as graphs which are shown as Figs. 4–6 of the drawing. Fig. 4 is based on data collected in the first cycle; Fig. 5 on data obtained in the second cycle; and Fig. 6 on data obtained in the third operating cycle. In the graphs, the concentration of each solute is expressed as a ratio, $C_e/C_f$, of the percent by weight of the solute in the indicated portion of the effluent liquor to the percent by weight of the same solute in the starting solution. From this ratio and the above-stated concentrations of the solutes in the starting solution, the percent by weight of either solute in any portion of the effluent liquor may be calculated.

EXAMPLE 2

The procedure of Example 1 was repeated, except that the starting solution employed was an aqueous solution of sodium chloride and ethylene glycol, each in 10 weight percent concentration. The concentrations of the respective solutes in consecutive portions of the effluent liquor obtained in each of the three operating cycles were plotted in the same way as was the data obtained in Example 1 and the resulting graphs are shown as Figs. 7–9 of the drawing. It will be evident, from a comparison of Figs. 7–9 with Figs. 4–6, that the increase in concentration of sodium chloride in the starting solution employed in this example over that in the starting solution employed in Example 1 caused an increase in the maximum concentration of ethylene glycol in the effluent liquor from the process.

EXAMPLE 3

The procedure of Example 1 was repeated, except that the aqueous solution of sodium chloride and ethylene glycol, which was employed as the starting solution, contained 20 weight percent of sodium chloride and 10 percent of ethylene glycol and that the process was continued through four operating cycles, the earlier 600 ml. portion of the effluent liquor fraction (from the third cycle) containing sodium chloride as the only solute being discarded and not again fed to the column of ion exchange resin. The concentration of sodium chloride and ethylene glycol in successive portions of the effluent liquor obtained in the first three operating cycles were plotted in the same way as was the data obtained in Example 1 and the resulting graphs for the respective cycles 1–3 are shown as Figs. 10–12 of the drawing. In the fourth operating cycle the ratio, $C_e/C_f$, for the concentration of ethylene glycol in the effluent liquor to the concentration of ethylene glycol in the starting solution increased to a maximum value of 2.32. A comparison of Figs. 10–12 with Figs. 4–9, especially with Figs. 7–9, shows that an increase in the concentration of sodium chloride in the starting solution causes an increase in the maximum concentration of ethylene glycol in the resulting effluent liquor.

EXAMPLE 4

Figure 16:
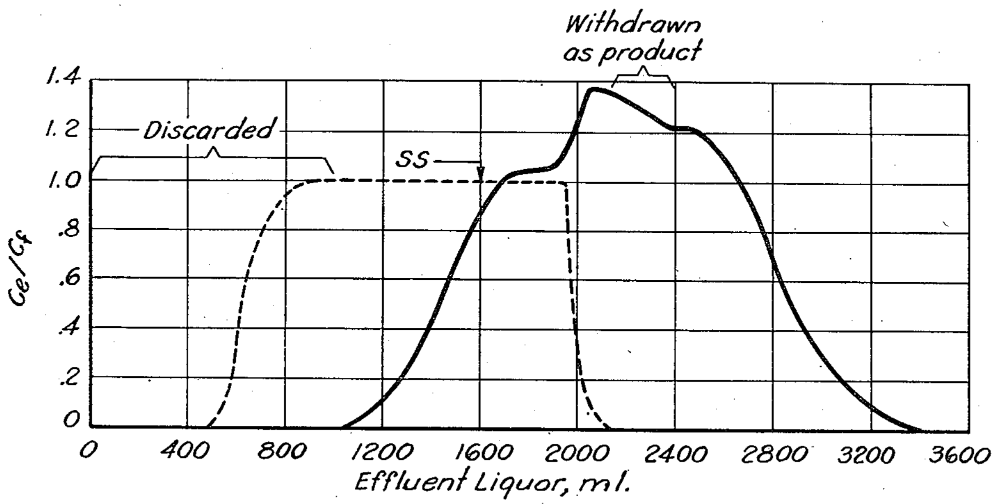
Figure 17:
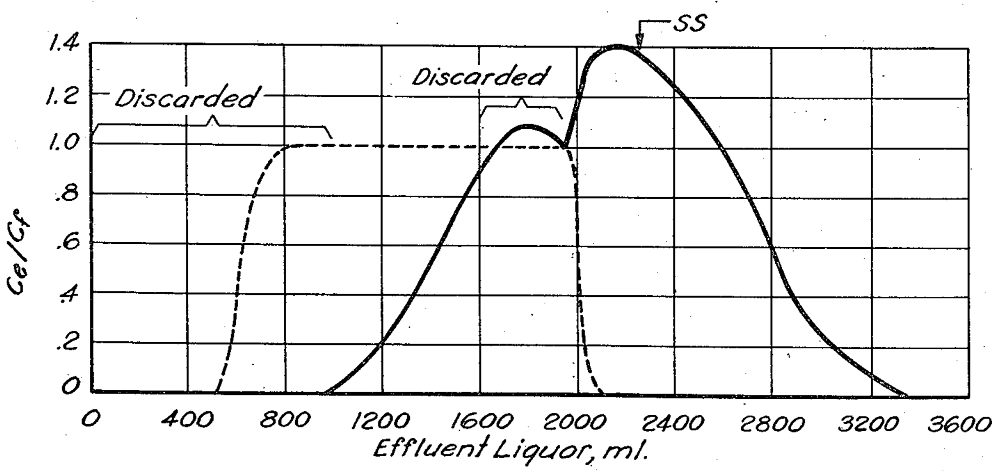

The procedure of Example 1 was repeated for a total of six operating cycles, except for being modified in the following respects. The starting solution which was employed was an aqueous solution of sodium chloride and ethylene glycol containing 10 percent by weight of each of the solutes. In each of the second through the fifth operating cycles of the process, starting solution was fed to the column of ion exchange resin at a stage earlier than the preferred stage hereinbefore stated for introducing the starting solution. In the sixth cycle of the process, starting solution was fed to the column at a stage later than the preferred stage. Portions of the effluent liquor obtained in each of the third, fourth and fifth cycles were discarded or withdrawn from the system and the remaining portions were returned, in the order in which they had been collected, as part of the feed material in the next cycle. The effluent liquor obtained in each cycle of the process was collected as successive 50 ml. portions which were tested to determine the concentrations of sodium chloride and ethylene glycol therein before being recycled or withdrawn from the process. The data thus obtained in the successive cycles of the process were plotted, in the same way as in the preceding examples. The resulting graphs, indicating the concentrations of sodium chloride and ethylene glycol in successive portions of the effluent liquor obtained in each of the successive cycles of the process, are shown as Figs. 13–18, respectively, of the drawing. Figs. 13–17, pertaining to effluent liquors obtained in the first to the fifth cycles, respectively, show that premature feed of the starting solution causes an increase in volume of the resulting effluent liquor fraction containing both of the solutes and thus necessitates recycling of a large volume of said fraction in order to avoid loss of part of the less ionized solute, but that premature feed of the starting solution is not highly detrimental and does not interfere with the operability of the process. Fig. 16 shows withdrawal, as product, of a portion of the effluent liquor, which portion contained ethylene glycol in a concentration higher than in the starting solution. Fig. 17 shows that the effluent liquor obtained in the fifth cycle comprised a portion equal in volume to, and as rich in ethylene glycol as the only solute present as, that withdrawn as product in the fourth cycle, i. e. withdrawal of a portion of liquor as product in the fourth cycle did not prevent formation of a similar product (capable of being withdrawn) in the fifth cycle of the process. Fig. 18 shows that introduction of the starting solution at a stage considerably later than the preferred stage hereinbefore mentioned caused formation of two distinct effluent liquor fractions containing the highly ionized solute, i. e. sodium chloride, which occurrence would complicate further recycling of the effluent liquor fractions and interfere with smooth operation of the process. Starting solution can be fed to the column at somewhat later than the aforementioned preferred stage of an operating cycle, e. g. when the concentration of the highly ionized solute in liquor being fed to the column has reached a maximum value and then decreased to as little as half said value. As hereinbefore mentioned, the starting solution is preferably fed at a stage in an operating cycle when the concentration of the highly ionized solution in liquor being fed to the bed of ion exchange resin has reached a maximum value and is at the point of decreasing.

EXAMPLE 5

The starting solution employed in this run was an aqueous solution of glycine, ammonium chloride, and glycine condensation products. It contained 13.75 percent by weight of glycine, 12.71 percent of ammonium chloride, and 4.64 percent of glycine condensation products. The ion exchange resin employed was the ammonium salt of Dowex 50 (a sulphonated copolymer of styrene, ar-ethylvinylbenzene and divinylbenzene) in the form of beads of from 50 to 100 Tyler screen mesh size. A column of 30 inches internal diameter was filled to a depth of 6 feet with a bed of the resin and with water. Starting solution was fed to the top of the column and liquid withdrawn at a corresponding rate from the bottom of the column until ammonium chloride was detected as present in the liquid flowing from the column. Liquid then in the column was displaced by feeding water to the top of the column. The displaced liquid, flowing from the bottom of the column, was collected in successive 15 gallon portions. Early portions of the effluent liquor, consisting of water or of an aqueous ammonium chloride solution which was substantially free of glycine, were discarded. The remaining portions were reserved for return, in the order in which they were collected, to the top of the column. The liquor feeding operations in the second cycle of the process involved return of effluent liquor from the first cycle until the concentration of ammonium chloride in the liquor being fed to the column had reached a maximum value and just started to decrease. A further amount of starting solution was next fed to the column. Remaining portions of the effluent liquor from the first cycle were then fed to the column. Water was again fed to the column. Displaced liquor flowing from the column was again collected in successive 15 gallon portions, the early portions consisting of water or an aqueous ammonium chloride solution being discarded and the remaining portions being reserved for recycling. A number of further cycles were carried out in a manner similar to the second cycle. The process was continued for a total of 19 cycles. Starting with the fourteenth cycle, and in each cycle thereafter, a 30 gallon portion of the effluent liquor, fairly rich in glycine and containing only a small proportion of ammonium chloride, was withdrawn as product. In the nineteenth cycle a further 30 gallons of effluent liquor containing a considerable amount of glycine and no ammonium chloride was withdrawn as product. The portions of liquor collected as product were combined. There was thus obtained, 210 gallons of product liquor containing 14.47 percent by weight of glycine and only 0.255 percent of ammonium chloride. A small sample of each of the successive 15 gallon portions of effluent liquor collected in the fourteenth cycle of the process was analyzed to determine the proportions of ammonium chloride, glycine and glycine condensation products therein. These do not include the early portions of such liquor (consisting of water or an aqueous ammonium chloride solution) which were discarded. The following table identifies the successive portions of liquor which were analyzed and gives the percent by weight of ammonium chloride, glycine and glycine condensation products in each. In the table, the glycine condensation products are termed "highers."

*Table I*

| Liquor Portion No. | Percent $NH_4Cl$ | Percent Glycine | Percent Highers |
|---|---|---|---|
| 1 | 10.57 | 1.20 | 3.99 |
| 2 | 12.99 | 3.87 | 3.85 |
| 3 | 12.37 | 7.77 | 5.10 |
| 4 | 12.24 | 11.52 | 3.96 |
| 5 | 12.18 | 12.27 | 4.83 |
| 6 | 12.22 | 13.13 | 5.25 |
| 7 | 12.24 | 13.83 | 4.59 |
| 8 | 11.66 | 14.09 | 4.19 |
| 9 | 9.45 | 14.09 | 6.03 |
| 10 | 7.08 | 14.15 | 6.68 |
| 11 | 4.90 | 14.95 | 4.92 |
| 12 | 1.31 | 16.47 | 2.01 |
| 13 | 0.52 | 16.98 | 0.62 |
| 14 | 0.33 | 17.04 | 0.06 |
| 15 | 0.18 | 16.08 | 0.45 |
| 16 | 0.11 | 14.68 | 2.66 |
| 17 | 0.081 | 13.02 | 0.34 |
| 18 | 0.046 | 11.15 | 0.20 |
| 19 | 0.037 | 9.38 | 0.09 |
| 20 | 0.037 | 7.93 | 0.10 |
| 21 | 0.023 | 7.23 | nil |
| 22 | 0.020 | 6.31 | nil |
| 23 | 0.017 | 5.36 | nil |
| 24 | 0.011 | 4.38 | nil |
| 25 | 0.12 | 4.22 | nil |
| 26 | 0.010 | 3.75 | nil |
| 27 | 0.010 | 3.16 | nil |
| 28 | 0.009 | 2.88 | nil |
| 29 | 0.010 | 2.96 | nil |
| 30 | 0.006 | 1.92 | nil |
| 31 | 0.006 | 1.46 | nil |
| 32 | 0.005 | 0.92 | nil |

EXAMPLE 6

The ion exchange resin employed in this experiment was a resinous quaternary ammonium chloride obtained by reaction of trimethylamine with a nuclear chloromethylated copolymer of styrene, ar-ethylvinylbenzene and divinylbenzene. The starting solution was an aqueous solution of sodium chloride and crude glycerine. It contained 9.7 percent by weight of sodium chloride and 5.98 percent of glycerine. Except for the kinds of starting materials employed, the procedure in carrying out successive cycles of the process was similar to that described in Example 1, i. e. the effluent liquor was collected in 50 ml. portions and the successive portions of effluent liquor (containing one, or both, of the solutes) obtained in each of the first two cycles of the process were returned as part of the feed material in the next cycle. Every other one, i. e. the first, third, and fifth, etc., of the successive portions of effluent liquor collected in the third cycle were analyzed to determine the concentrations of sodium chloride and glycerine therein. Table II gives the percent by weight of sodium chloride and glycerine in each of these portions of the effluent liquor which contained one, or both, of the solutes.

*Table II*

| Liquor Portion No. | Percent NaCl | Percent Glycerine |
|---|---|---|
| 1 | 1.96 | 0.12 |
| 3 | 6.07 | 0.13 |
| 5 | 8.85 | 0.14 |
| 7 | 9.30 | 0.35 |
| 9 | 9.73 | 0.73 |
| 11 | 9.91 | 1.65 |
| 13 | 9.92 | 2.89 |
| 15 | 9.91 | 4.09 |
| 17 | 9.91 | 4.81 |
| 19 | 9.94 | 5.27 |
| 21 | 9.86 | 5.20 |
| 23 | 4.51 | 7.46 |
| 25 | 0.13 | 9.41 |
| 27 | 0.068 | 9.03 |
| 29 | 0.066 | 8.89 |
| 31 | 0.049 | 8.18 |
| 33 | 0.029 | 6.86 |
| 35 | 0.025 | 5.13 |
| 37 | 0.023 | 2.95 |
| 39 | 0.017 | 1.47 |

The invention can be applied using starting solutions and ion exchange resins other than those mentioned in the foregoing specific examples. Other ion exchange resins which can be used are the sulphonated phenol-formaldehyde resins, the well known carboxylated resins, and condensation products of phenol, formaldehyde and polyethylene polyamines such as diethylene triamine, etc. Examples of other starting solutions, comprising one or more highly ionized solutes and one or more less ionized or non-ionized solutes, which may be treated by the method of the invention to separate the less ionized solute from the highly ionized solute are aqueous solutions of glycerine and sodium chloride; aqueous solutions of acetic acid and the more highly ionized compounds, dichloroacetic acid and trichloroacetic acid; and aqueous solutions of ethyl alcohol and ammonium sulfate; etc.

We claim:

1. A method for separating from one another a highly ionized solute having an ionization constant at least as great as $5\times10^{-2}$ and a less extensively ionized solute that is capable of being absorbed by an ion exchange resin and that has an ionization constant not exceeding $2\times10^{-1}$ and not more than 70 percent as great as that of the highly ionized solute, which method comprises separately feeding water and an aqueous starting solution of both of said solutes into contact with a body of a granular ion exchange resin, having an ion identical with an ion of the highly ionized solute, and contacting the resin with aqueous solutions of both of said solutes in proportions different from those in the starting solution, in a manner such that a portion of the body of ion exchange resin is contacted with (*a*) an aqueous solution of both solutes, which solution contains a larger proportion of the highly ionized solute relative to the less ionized solute than in the starting solution, (*b*) the starting solution, (*c*) an aqueous solution of both solutes, which solution contains a larger proportion of the less ionized solute relative to the highly ionized solute than in the starting solution, (*d*) an aqueous solution of the less ionized solute in a form substantially free of the highly ionized solute; and (*e*) the water, in the order just given, whereby there are formed three distinct treated liquor fractions, namely, (1) a fraction consisting essentially of an aqueous solution of the highly ionized solute in a form substantially free of the less ionized solute, (2) a fraction consisting essentially of an aqueous solution of both solutes, which fraction contains the solutes in proportions which vary from one portion of the fraction to another, and (3) a fraction consisting essentially of an aqueous solution of the less ionized solute in a form substantially free of the highly ionized solute, and causing at least two of said treated liquor fractions, namely fractions (1) and (3), to flow out of contact with the body of ion exchange resin.

2. A method which comprises feeding an aqueous solution of a highly ionized solute, having an ionization constant at least as great as $5\times10^{-2}$, and a less ionized solute, that is capable of being absorbed by an ion exchange resin and that has an ionization constant not exceeding $2\times10^{-1}$ and not more than 70 percent as great as that of the highly ionized solute, to a mid-section of a column of the ion exchange resin immersed in aqueous liquor, feeding water to an end section of the column and causing it to flow lengthwise within the column, feeding ion exchange resin to the opposite end section of the column and withdrawing it at a corresponding rate from the end section of the column into which water is being fed, withdrawing the resulting liquor fraction consisting essentially of an aqueous solution of the highly ionized solute in a form substantially free of the less ionized solute from the end section of the column into which the ion exchange resin is fed, and withdrawing the resulting liquor fraction consisting essentially of an aqueous solution of the less ionized solute in a form substantially free of the highly ionized solute from a mid-section of the column at a point between the point of feed of the starting solution and the point of feed of water to the column.

3. A method, as claimed in claim 2, wherein the highly ionized solute is sodium chloride and the less ionized solute is ethylene glycol.

4. A method, as claimed in claim 2, wherein the highly ionized solute is sodium chloride and the less ionized solute is glycerine.

5. A method, as claimed in claim 2, wherein the highly ionized solute is ammonium chloride and the less ionized solute is glycine.

6. A method, as claimed in claim 2, wherein the starting solution contains the highly ionized solute in a concentration at least as high as 1-normal.

7. In a method for separating from one another a highly ionized solute having an ionization constant at least as great as $5\times10^{-2}$ and a less extensively ionized solute that is capable of being absorbed by an ion exchange resin and that has an ionization constant not greater than $2\times10^{-1}$ and not more than 70 percent as great as that of the highly ionized solute, wherein there is carried out a first cycle of operations of feeding to a bed of an ion exchange resin having an ion identical with an ion of the highly ionized solute a sufficient amount of an aqueous starting solution of both of such solutes so that part of the less ionized solute is preferentially absorbed by the resin leaving the remainder of the less ionized solute and the highly ionized solute in surrounding liquor, feeding water to the bed to displace liquid therefrom, collecting successive fractions of the displaced effluent liquid, whereby there are obtained a fraction *f*1 of the effluent liquid containing the highly ionized solute in a form substantially free of the less ionized solute, a mixed fraction *f*2 of the effluent liquid containing both of the solutes, and a fraction *f*3 of the effluent liquid containing the less ionized solute in a form substantially free of the highly ionized solute, the steps of carrying out a second operating cycle which comprises feeding a fore-portion of said effluent liquor fraction *f*2 to the bed of ion exchange resin, then feeding to the bed a further amount of the starting solution containing both of the solutes, next feeding to the bed a later portion of the effluent liquor fraction *f*2, next feeding to the bed at least a portion of said effluent liquor fraction *f*3, and next again feeding water to the bed and, collecting successive portions of the effluent liquor similar in kind to those collected in the first cycle, repeating at least once this second cycle of operations and withdrawing a portion of the above-identified resulting effluent liquor fraction *f*3 as product.

8. A method, as claimed in claim 7, wherein the starting solution contains the highly ionized solute in at least as high as 1-normal concentration.

9. A method, as claimed in claim 7, wherein the step of returning, to the bed of ion exchange resin, effluent liquor collected in the preceding cycle of the process is interrupted when the concentration of the highly ionized solute in the liquor being fed to the bed has reached a maximum value and is about to decrease, and then feeding a further amount of the starting solution to the bed.

10. A method, as claimed in claim 9, wherein the highly ionized solute is sodium chloride and the less ionized solute is ethylene glycol.

11. A method, as claimed in claim 9, wherein the highly ionized solute is ammonium chloride and the less ionized solute is glycine.

12. A method, as claimed in claim 9, wherein the highly ionized solute is sodium chloride and the less ionized solute is glycerine.

13. In a method for treating an aqueous starting solution containing a highly ionized solute having an ionization constant at least as great as $5\times10^{-2}$ and a less extensively ionized solute that is capable of being absorbed by an ion exchange resin and that has an ionization constant not greater than $2\times10^{-1}$ and not more than 70 percent as great as that of the highly ionized solute to separate a liquor fraction containing the less ionized solute in a concentration higher than in the starting solution and in a form substantially free of the highly ionized solute, wherein there is carried out a first cycle of operations of feeding to a bed of an ion exchange resin, having an ion identical with an ion of the highly ionized solute, a sufficient amount of such aqueous starting solution, containing the highly ionized solute in at least as high as 1-normal concentration, so that part of the less ionized solute is preferentially absorbed by the resin leaving the highly ionized solute and the remainder of the less ionized solute in surrounding liquor, feeding water to the bed to displace liquid therefrom, collecting successive fractions of the displaced effluent liquid, whereby there are obtained a fraction *f*1 of the effluent liquid containing the highly ionized solute in a form substantially free of the less ionized solute, a mixed fraction *f*2 of the effluent liquid containing both of the solutes, and a fraction *f*3 of the effluent liquid containing the less ionized solute in a form substantially free of the highly ionized solute, the steps of carrying out a second operating cycle which comprises feeding a fore-portion of said effluent liquor fraction *f*2 to the bed of ion exchange resin, then feeding a further amount of the starting solution, containing both of the solutes with the highly ionized solute in at least as high as 1-normal concentration, to the bed, next feeding to the bed a later portion of the effluent liquor fraction *f*2, next feeding to the bed at least a portion of said effluent liquor fraction *f*3, and next again feeding water to the bed and, collecting successive portions of the effluent liquor similar in kind to those collected in the first cycle, including a portion of effluent liquor containing the less ionized solute in a concentration higher than in the starting solution, repeating at least once this second cycle of operations and withdrawing a portion of the effluent liquor fraction *f*3 which contains the less ionized solute in a concentration higher than in the starting solution.

14. A method, as claimed in claim 13, wherein the highly ionized solute is sodium chloride and the less ionized solute is ethylene glycol.

15. A method, as claimed in claim 13, wherein the highly ionized solute is ammonium chloride and the less ionized solute is glycine.

16. A method, as claimed in claim 13, wherein the highly ionized solute is sodium chloride and the less ionized solute is glycerine.

References Cited in the file of this patent

UNITED STATES PATENTS

| | | |
|---|---|---|
| 2,470,339 | Claussen et al. | May 17, 1949 |
| 2,564,717 | Olsen | Aug. 21, 1951 |
| 2,585,490 | Olsen | Feb. 12, 1952 |
| 2,585,491 | Olsen | Feb. 12, 1952 |
| 2,585,492 | Olsen | Feb. 12, 1952 |

OTHER REFERENCES

Ind. and Eng. Chem., vol. 45, No. 1, January 1953, pages 228–233.

Chem. and Eng. News., vol. 30, September 29, 1952, page 4064.